United States Patent
Ciccaglione et al.

(10) Patent No.: US 8,035,497 B2
(45) Date of Patent: *Oct. 11, 2011

(54) MULTI-FACE, MULTI-EVENT, ORIENTATION SENSOR

(75) Inventors: Terry M. Ciccaglione, Cold Springs, NY (US); Mark E. Maresh, Raleigh, NC (US); Robert T. Sanders, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/964,121

(22) Filed: Dec. 9, 2010

(65) Prior Publication Data

US 2011/0077901 A1    Mar. 31, 2011

Related U.S. Application Data

(63) Continuation of application No. 11/608,636, filed on Dec. 8, 2006, now Pat. No. 7,880,598.

(51) Int. Cl.
G08B 21/00 (2006.01)
G09G 5/08 (2006.01)
G08G 1/16 (2006.01)

(52) U.S. Cl. ............ 340/440; 340/686.1; 340/689; 340/690; 345/161; 701/300

(58) Field of Classification Search ............ None
See application file for complete search history.

(56) References Cited

U.S. PATENT DOCUMENTS

| | | | |
|---|---|---|---|
| 4,419,891 A | 12/1983 | Browning | |
| 5,202,559 A | 4/1993 | Durst | |
| 5,526,022 A * | 6/1996 | Donahue et al. | 345/156 |
| 5,610,590 A * | 3/1997 | Johnson et al. | 340/573.4 |
| 5,767,767 A * | 6/1998 | Lima et al. | 340/438 |
| 5,835,012 A | 11/1998 | Wilk | |
| 5,955,713 A | 9/1999 | Titus et al. | |
| 5,991,693 A * | 11/1999 | Zalewski | 701/300 |
| 6,046,678 A | 4/2000 | Wilk | |
| 6,104,307 A | 8/2000 | Hanratty | |
| 6,148,669 A | 11/2000 | Roest | |
| 6,356,203 B1 | 3/2002 | Halleck et al. | |
| 6,558,509 B2 | 5/2003 | Kraus et al. | |
| 6,995,680 B2 * | 2/2006 | Fong | 340/686.1 |
| 7,239,248 B2 | 7/2007 | Fong | |
| 7,252,001 B2 | 8/2007 | Boletis et al. | |
| 7,532,940 B2 | 5/2009 | Ishizawa | |
| 7,665,951 B2 | 2/2010 | Kurita et al. | |
| 2004/0239518 A1 | 12/2004 | Fong | |
| 2007/0124503 A1 | 5/2007 | Ramos et al. | |

OTHER PUBLICATIONS

Camarata et al., "Navigational Blocks Navigating Information Space with Tangible Media", IUI'02, Jan. 2002, pp. 1-8. http://depts.washington.edu/dmgftp/publications/pdfs/iui02_camarata.pdf.

* cited by examiner

*Primary Examiner* — Jennifer Mehmood
*Assistant Examiner* — Fekadeselassie Girma
(74) *Attorney, Agent, or Firm* — Yee & Associates, P.C.; Steven L. Bennett

(57) ABSTRACT

An apparatus and a computer implemented method for monitoring and recording the orientation data for an object. The orientation apparatus comprises an outer casing. Inside the outer casing is an orientation device that comprises six chambers, with a ball sensor in each chamber, and a ball. The orientation apparatus also comprises a data recorder for recording an event history of the orientation device, and a communicator for conveying the event history.

15 Claims, 8 Drawing Sheets

EVENT HISTORY
700

702 {
- CURRENT POSITION — E
- CURRENT DATE — 4/19/2006
- CURRENT TIME — 18:43
- DURATION — 0 HRS 50 MIN
- !!! ALARM INDICATED !!!

704 {
- EVENT — 3
- DATE — 4/18/2006
- TIME — 17:43
- FACE — A
- DURATION — 25 HRS 0 MIN

706 {
- EVENT — 2
- DATE — 4/18/2006
- TIME — 17:20
- FACE — B
- DURATION — 0 HRS 23 MIN
- !!! ALARM INDICATED !!!

708 {
- EVENT — 1
- DATE — 4/18/2006
- TIME — 7:50
- FACE — A
- DURATION — 9 HRS 30 MIN

*FIG. 7*

MULTI-FACE, MULTI-EVENT, ORIENTATION SENSOR

CROSS-REFERENCE TO RELATED APPLICATIONS

This application is a continuation of and claims priority to U.S. application Ser. No. 11/608,636 filed on Dec. 8, 2006 and entitled SIX FACE, MULTI-EVENT, ORIENTATION SENSOR, the entire contents of which is expressly incorporated herein by reference.

BACKGROUND

1. Field

The illustrative embodiments relate generally to an apparatus, a monitoring system, and a computer implemented method for detecting an orientation of an object, and in particular, to an apparatus and a method for monitoring and recording the orientation data for an object.

2. Description of the Related Art

Mercury switches are historically used in electrically controlled mechanical systems, wherein the physical orientation of actuators or rotors is a factor. Mercury switches are also commonly used in vending machines that have 'tilt alarms'. When the machine is rocked or tilted in an attempt to gain a product, the mercury switch activates, sounding an alarm. A conventional tilt switch includes a glass envelope that contains a ball of mercury. A pair of electrodes is situated at one end of the envelope. The mercury forms an electrical contact between the electrodes. The electrical contact occurs when the switch is oriented so that the mercury extends to the ends of the envelope containing the electrodes. The mercury acts as a conductor, passing electricity from one electrode to the other. In certain applications, it is important to measure whether an electronic device is oriented upwards, downwards, or at an angle in between. For some applications, it is possible to use a number of conventional tilt switches together, where each tilt switch is mounted on a different orientation so that the closing or opening of a particular switch may take up significant real estate in the device. The individual switches must typically be mounted in precise orientation relative to each other in order for the combination of tilt switches to be effective.

Another type of orientation switch or tilt sensor is historically found in pinball machines. The sensor consists of a metal ring with a cone-shaped pendulum bob hanging through the center of it. Normally, the bob hangs so that none of the bob is touching the ring. As the pinball machine is shaken, the bob moves closer to the edges of the conductive ring. Once the bob touches the ring, a current is transferred and a tilt is registered.

Another type of orientation switch is a ball and socket switch. Ball and socket switches depend upon the force of gravity, and are characterized by a deviation from a base plane. This deviation forms a particular position of the base plane with respect to the force of gravity in a certain direction. The particular position of the base plane with respect to the force of gravity is the rest position of the base plane. Ball and socket switches of this kind are used to signal the deviation of an object from a given rest or operating position, and they may also be used to produce switching or control commands that depend on a position or a setting. Such a switch may be incorporated into portable appliances or equipment, especially fan heaters, irons, and the like. The ball and socket switches monitor the operating position of the equipment, and then cut off the current supply whenever the appliance assumes a position other than the normal operating position of the appliance.

Known tilt devices record a tip over in only one or two axes. Most tip devices only record a single tip event, and many tilt devices do not record when the event occurs, or the duration of the improper orientation.

SUMMARY

The illustrative embodiments provide for an apparatus and a computer implemented method for monitoring and recording the orientation data for an object. The orientation apparatus comprises an outer casing. Inside the outer casing is an orientation device that comprises six chambers, with a ball sensor in each chamber, and a ball. The orientation apparatus also comprises a data recorder for storing an event history of the orientation device, and a communicator for conveying the event history.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 shows an example orientation output formed by the apparatus in accordance with the illustrative embodiments.

DETAILED DESCRIPTION

The illustrative embodiments provide an apparatus and a computer implemented method for monitoring and recording the orientation data for an object. The apparatus comprises an orientation device, which detects the orientation of the object, a data recorder that keeps a record of the orientation of the object over time, and a method of communicating the orientation history to the user in an event history. One embodiment of the illustrative invention may communicate an alarm if the apparatus senses an improper orientation.

Another embodiment of the orientation apparatus may have, but is not limited to, an outer casing of roughly a cube shape. The cube houses an orientation device comprising six chambers. The cube may also house the instrumentation required for recording and communicating the orientation history of the object. Alternatively, the instrumentation may be located within the body of the casing, or may be remotely located.

Each of the six chambers terminates at a different center face of the cube. The six chamber device has a ball inside. The ball is free to roll around inside of the six chamber structure, influenced by gravity. When the ball comes to rest in the tip of the one chamber that is facing downward, the ball sensor senses the ball in the chamber tip and an event is recorded. The ball sensor may be a pressure sensor.

Alternatively, the ball may be metal and when the ball is contacted by electrodes in the tip of the chamber, a circuit is completed and the ball is sensed. Those of ordinary skill in the art may appreciate that there are other methods of implementing a ball sensor and that other ball sensors are within the scope of the illustrative embodiments.

Figure 1:
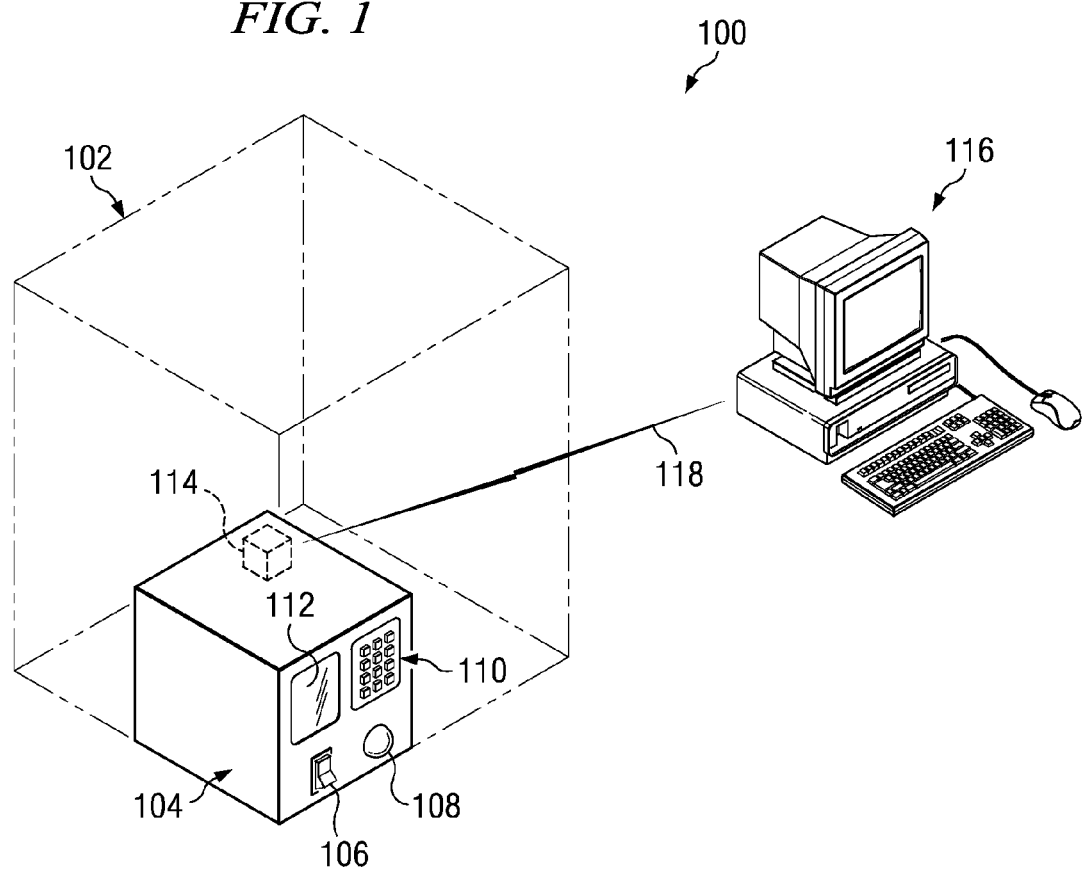
FIG. 1 is a pictorial representation of the apparatus for detecting, recording, and communicating orientation data as incorporated into an object in accordance with the illustrative embodiments.

With reference now to the figures and in particular with reference to FIG. 1 is a pictorial representation of the apparatus for detecting, recording, and communicating orientation data as incorporated into an object, in accordance with the illustrative embodiments. Object 102 may be any object in which the orientation of the object is of interest. For example, object 102 may be a motor vehicle, a piece of military equipment, a large computer system, a self correcting robot or a self guided vehicle, to enumerate a few. Other important objects may be shipping containers or tankers that contain hazardous material. If the orientation apparatus is connected to a global positioning satellite (GPS) device and a communication device, the apparatus may inform the first responders whether the container has been tipped over, thereby notifying the first responders of a potential hazard. Orientation apparatus 104 may be incorporated into object 102 by attaching the apparatus within the body of object 102 as shown in this example. Orientation apparatus 104 may also be attached to the outside of the object. Further, orientation apparatus 104 may be attached to the outside or inside of the object's packing material. Orientation apparatus 104 may also be equipped with a magnetic side to attach to the inside or outside of a metal container.

Orientation apparatus 104 may have an on/off switch, such as switch 106. Orientation apparatus 104 may also have an indicator light, such as indicator light 108, which indicates whether there has been tilt activity. For example, indicator light 108 may be green if orientation apparatus 104 is activated and there has been no tipping activity or time event. Indicator light 108 may be red if the orientation apparatus is activated and there has been a tipping event. An indicator may be any status indicator.

Touchpad 110 and display screen 112 may optionally be included in orientation apparatus 104. Communication through touchpad 110 and display screen 112 may provide the complete history of the orientation of object 102.

Antenna 114 may be optionally included in orientation apparatus 104 to allow for remote communication of the orientation data to remote processing unit 116. Remote processing unit 116 may be the processing unit that initially stores the orientation data and provides the user interface for orientation apparatus 104. Alternatively, remote processing unit 116 may receive processed data from the orientation apparatus from a processor located locally to orientation apparatus 104.

Orientation apparatus 104 may also communicate to remote processing system 116 through radio frequency identifiers (RFID), personal area networks (Bluetooth), a universal serial bus (USB) port, a local area network (LAN) line, portable memory such as a magnetic, optical or solid state disks, or using any another data transferal system, as represented by data carrier 118. Orientation apparatus 104 may store the orientation information on a chip or other type of portable memory carried within the casing of orientation apparatus 104. Alternatively orientation apparatus 104 may convey orientation information externally to a recording device via a wired connection or wireless connection. Although the depicted representation shows a simple box, other embodiments may be implemented in other types and shapes of outer casings.

Figure 2:
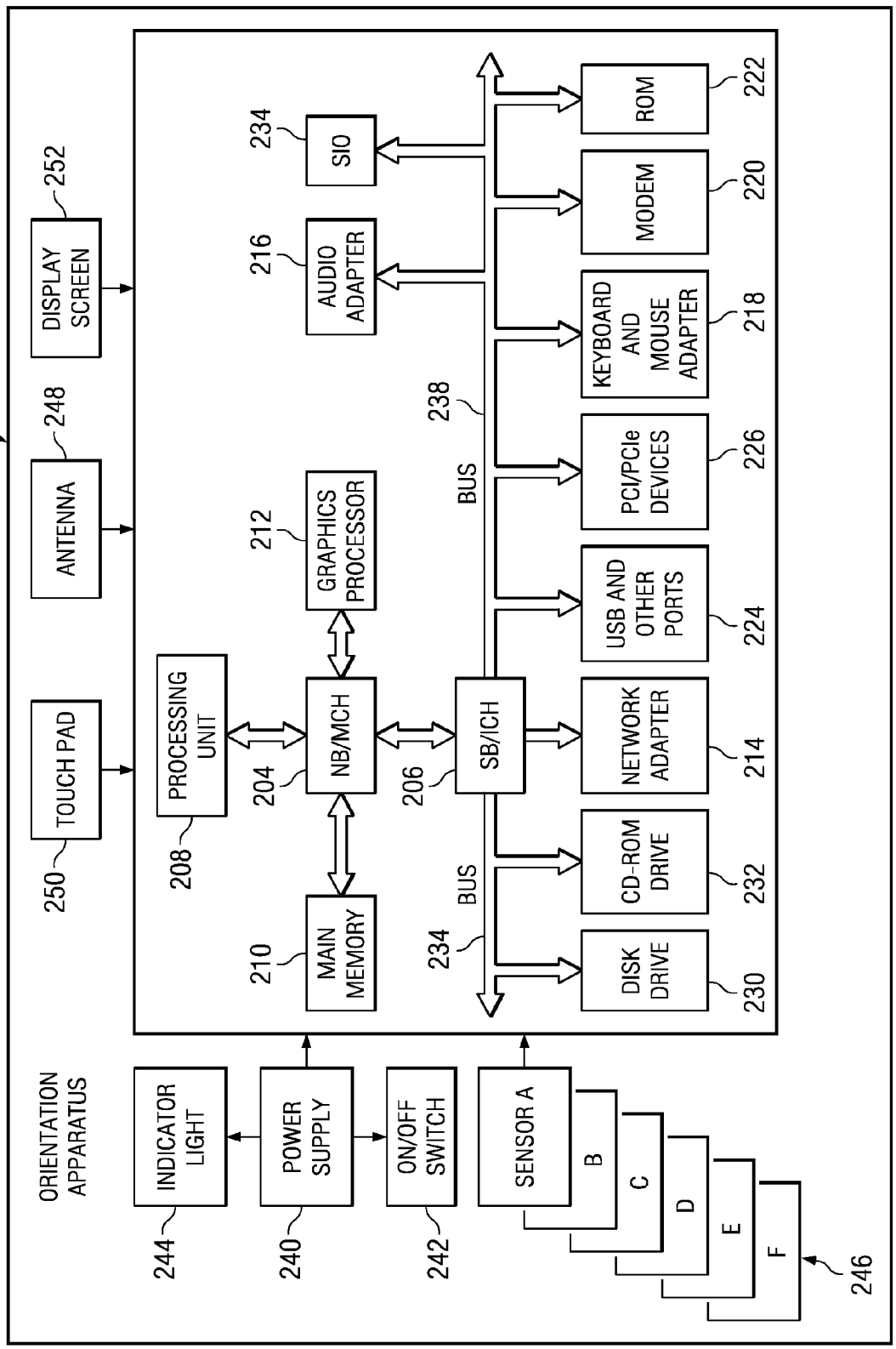
FIG. 2 depicts a block diagram of the apparatus for detecting, recording, and communicating the orientation data for an object in accordance with the illustrative embodiments.

FIG. 2 depicts a block diagram of an orientation apparatus in accordance with the illustrative embodiments. Orientation apparatus 200, such as orientation apparatus 104 in FIG. 1, includes instrumentation block 202. Instrumentation block 202 is a data processing block with optional components. In the depicted example, instrumentation block 202 employs a hub architecture including a north bridge and memory controller hub (MCH) 204 and a south bridge and input/output (I/O) controller hub (ICH) 206. Processing unit 208, main memory 210, and graphics processor 212 are coupled to north bridge and memory controller hub 204. Processing unit 208 may contain one or more processors and even may be implemented using one or more heterogeneous processor systems. Graphics processor 212 may be coupled to the MCH through an accelerated graphics port (AGP), for example.

In the depicted example, local area network (LAN) adapter 214 is coupled to south bridge and I/O controller hub 206, audio adapter 216, keyboard and mouse adapter 218, modem 220, read only memory (ROM) 222, universal serial bus (USB) ports, and other communications ports 224. PCI/PCIe devices 226 are coupled to south bridge and I/O controller hub 206 through bus 228. Disk drive (HDD) 230 and CD-ROM drive 232 are coupled to south bridge and I/O controller hub 204 through bus 234.

PCI/PCIe devices may include, for example, Ethernet adapters, add-in cards, and PC cards for notebook computers. PCI uses a card bus controller, while PCIe does not. ROM 222 may be, for example, a flash binary input/output system (BIOS). Disk drive 230 and CD-ROM drive 232 may use, for example, an integrated drive electronics (IDE) or serial advanced technology attachment (SATA) interface. A super I/O (SIO) device 234 may be coupled to south bridge and I/O controller hub 204.

An operating system runs on processing unit 208. This operating system coordinates and controls various components within instrumentation block 202 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on instrumentation block 202. Java™ and all Java-based trademarks are trademarks of Sun Microsystems, Inc. in the United States, other countries, or both.

Instructions for the operating system, the object-oriented programming system, and applications or programs are located on storage devices, such as disk drive 230. These instructions and may be loaded into main memory 210 for execution by processing unit 208. The processes of the illustrative embodiments may be performed by processing unit 208 using computer implemented instructions, which may be located in a memory. An example of a memory is main memory 210, read only memory 222, or in one or more peripheral devices.

Data transfer may take place between orientation apparatus 200 and other computers in one embodiment by transferring removable storage media. I/O controller 206 is attached to communication bus 228. I/O controller 206 may control the communication of the orientation data.

Orientation apparatus 200 may optionally include a graphical user interface (GUI) that may be implemented by means of system software residing in computer readable media in operation within instrumentation block 202. A graphics processor may be coupled to the processing unit through an accelerated graphics port (AGP), for example. Orientation apparatus 200 may display the graphics on a display screen, such as display screen 112 in FIG. 1.

Orientation apparatus 200 may also have a touch pad and or a mouse adapter, a modem, read only memory (ROM), universal serial bus (USB) ports, and other communications ports. Instrumentation block 202 coordinates and controls various components within orientation apparatus 200.

Orientation apparatus 200 also has power supply 240. Power supply 240 may be a set of batteries. On/Off switch 242 controls power supply 240. Indicator light 244, communicates with instrumentation block 202 and is powered by power supply 240. Sensors 246 communicate with instrumentation block 202. Antenna 248, touch pad 250, and display screen 252 all interface with instrumentation block 202.

The hardware shown in FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 2. Examples of additional optional input devices include a touch screen, a trackball, and the like. Further, other embodiments may comprise other configurations of a communication block, a storage block, or a processor unit in instrumentation block 202. In other words, the instrumentation block 202 may have only one of a communication block, a storage block or a processor unit or may have any combination of a communication block, storage block and processor unit.

Other components shown in FIG. 2 can be varied from the illustrative examples shown. For example, a bus system may be comprised of one or more buses, such as a system bus, an I/O bus, and a PCI bus. Of course, the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Also, a processing unit may include one or more processors or CPUs.

The depicted examples in FIG. 2 are not meant to imply architectural limitations. In addition, the illustrative embodiments provide for a computer implemented method, apparatus, and computer usable program code for compiling source code and for executing code.

Figure 3:
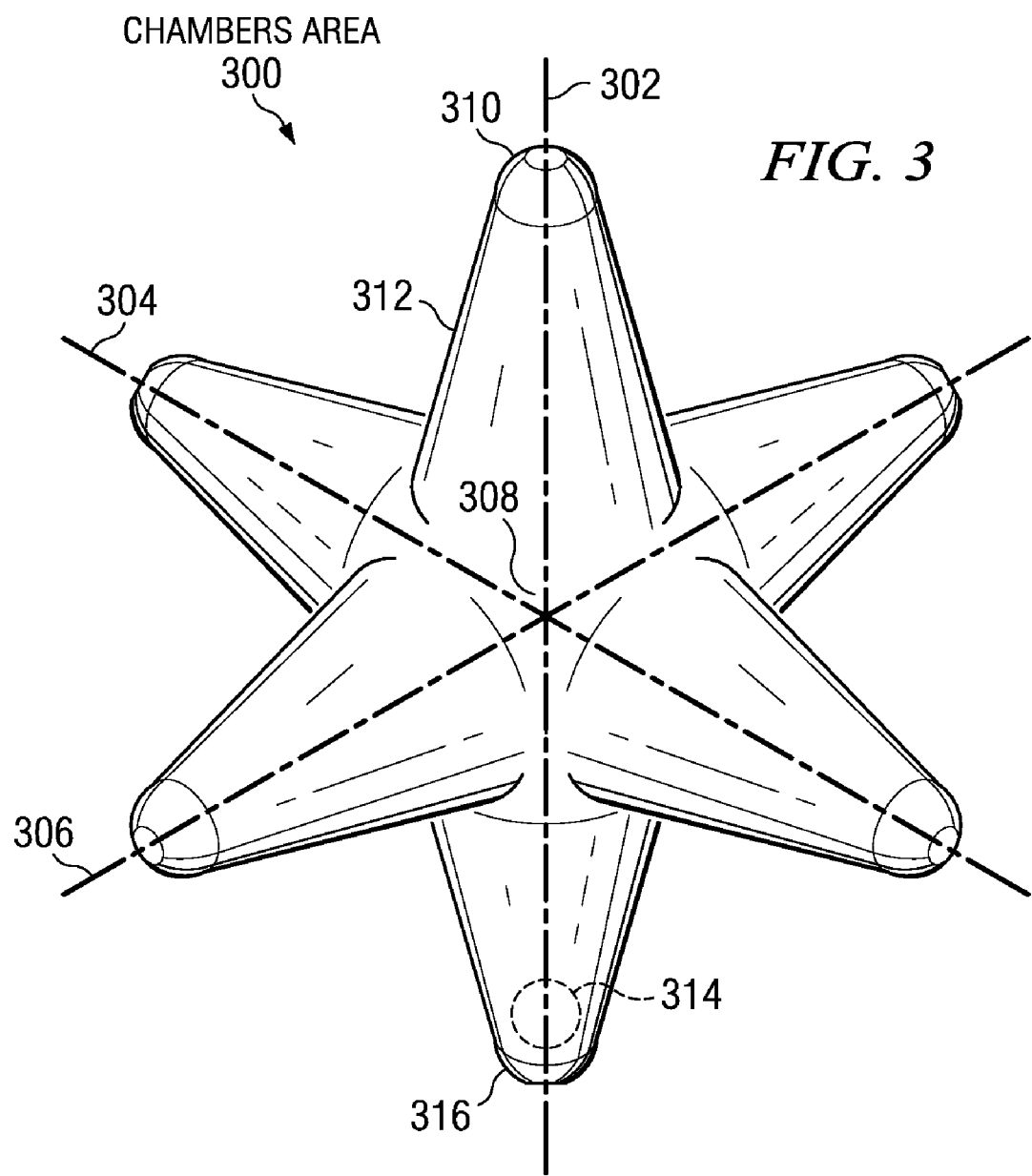
FIG. 3 is a pictorial representation of an outer surface of the chambers area of the orientation apparatus in accordance with the illustrative embodiments.

Next, FIG. 3 depicts a pictorial representation of an outer surface of the chambers area of the orientation apparatus in accordance with the illustrative embodiments. Chambers area 300 of the orientation apparatus has three axes. Axis 302, axis 304, and axis 306 intersect in a roughly spherical center region 308 of chambers area 300, and each axis is perpendicular to the others. Each axis has two radian chambers that stretch from center region 308 of the structure outward. Each chamber is roughly conically shaped with narrow end 310 of the chamber towards the outer casing, and wide end 312 towards center region 308. Another embodiment may have, for example, a taper of 5 to 15 degrees from the flat tip of the cone to the opposing end of the cone. There are six such conical chambers in the orientation device. In another embodiment, the chambers may be pyramid shaped.

The chambers are designed to allow the free transfer of ball 314 throughout the chambers. Ball 314, influenced by gravity, falls down to the tip of the chamber that is oriented down. In one embodiment of chambers area 300, the inner structure of the device is substantially hollow. The tip of each chamber contains a ball sensor, such as ball sensor 316. Ball sensor 316 may be any type of sensor capable of sensing ball 314, such as an electrical contact or pressure switch. Ball sensor 316 communicates sensor information to an instrumentation block, such as instrumentation block 202 in FIG. 2, located outside of chambers area 300.

Figure 4:
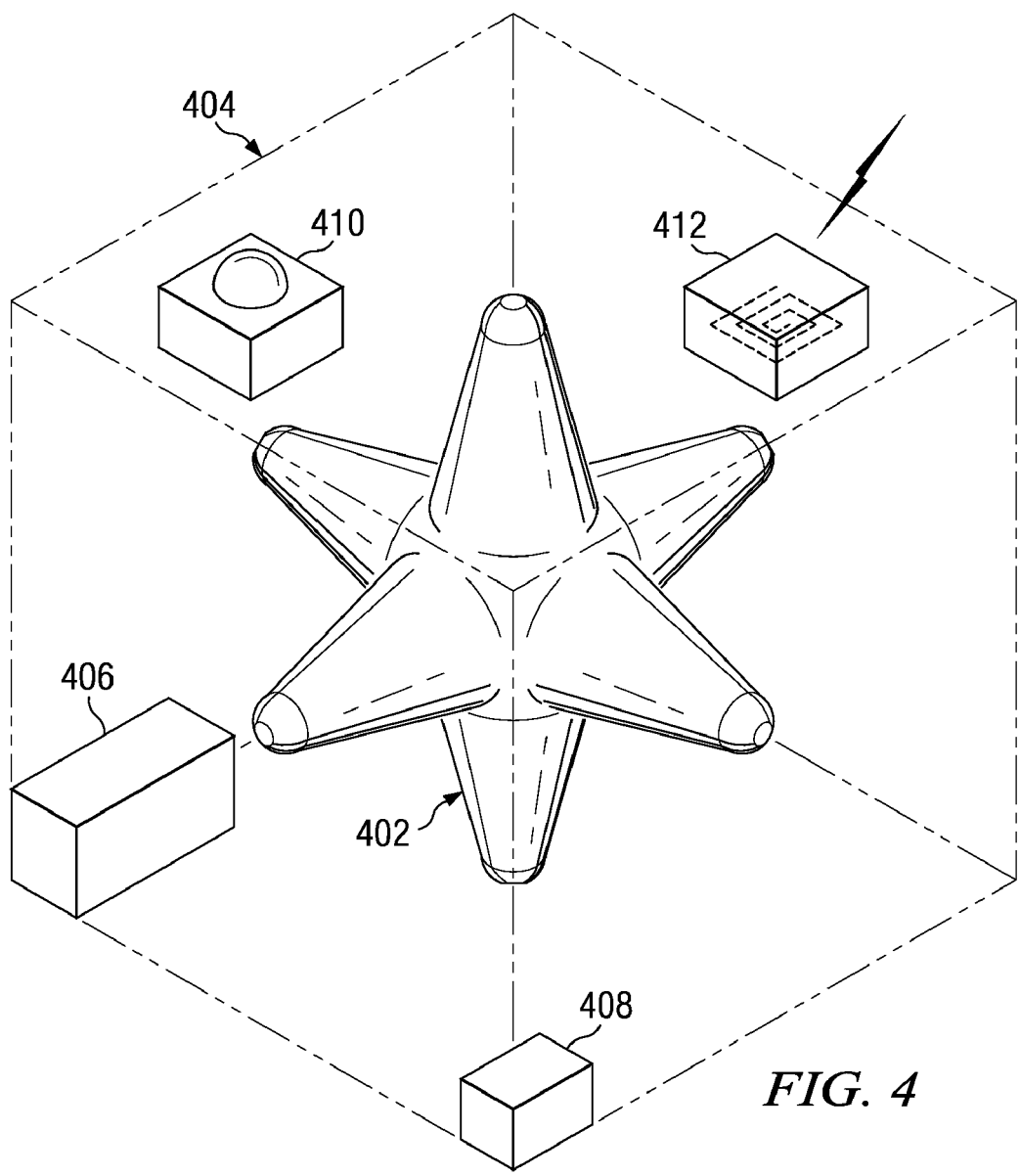
FIG. 4 depicts an orientation apparatus in a transparent outer casing in accordance with the illustrative embodiments.

FIG. 4 shows an orientation apparatus in a transparent outer casing according to the illustrative embodiments. Looking now at FIG. 4, the chambers area 402, such as chambers area 302 in FIG. 3, is surrounded by outer casing 404. Outer casing 404 is transparent and cubical in this embodiment. However, those of ordinary skill in the art will appreciate that outer casing 404 may be made of many types of materials, both transparent and opaque, and may be of another shape. In one embodiment, instrumentation block 406 may be located outside of chambers area 402 and inside of outer casing 404. Other components and optional components such as power supply 408, indicator light 410, and alarm signal 412 may also be located outside chambers area 402 and inside, or partially inside, outer casing 404. In another embodiment, instrumentation block 406 and other components may be located outside of outer casing 404.

The orientation apparatus may trigger a type of audible alarm if the orientation sensor detects the product in an unsafe position. Alternatively, or additionally, the orientation apparatus may light an indicator light, or cause a color change of an indicator light. Thus, the orientation sensor system may give a real time alarm to a product carrier or a user, and the orientation sensor system may store the information for future reference.

Figure 5:
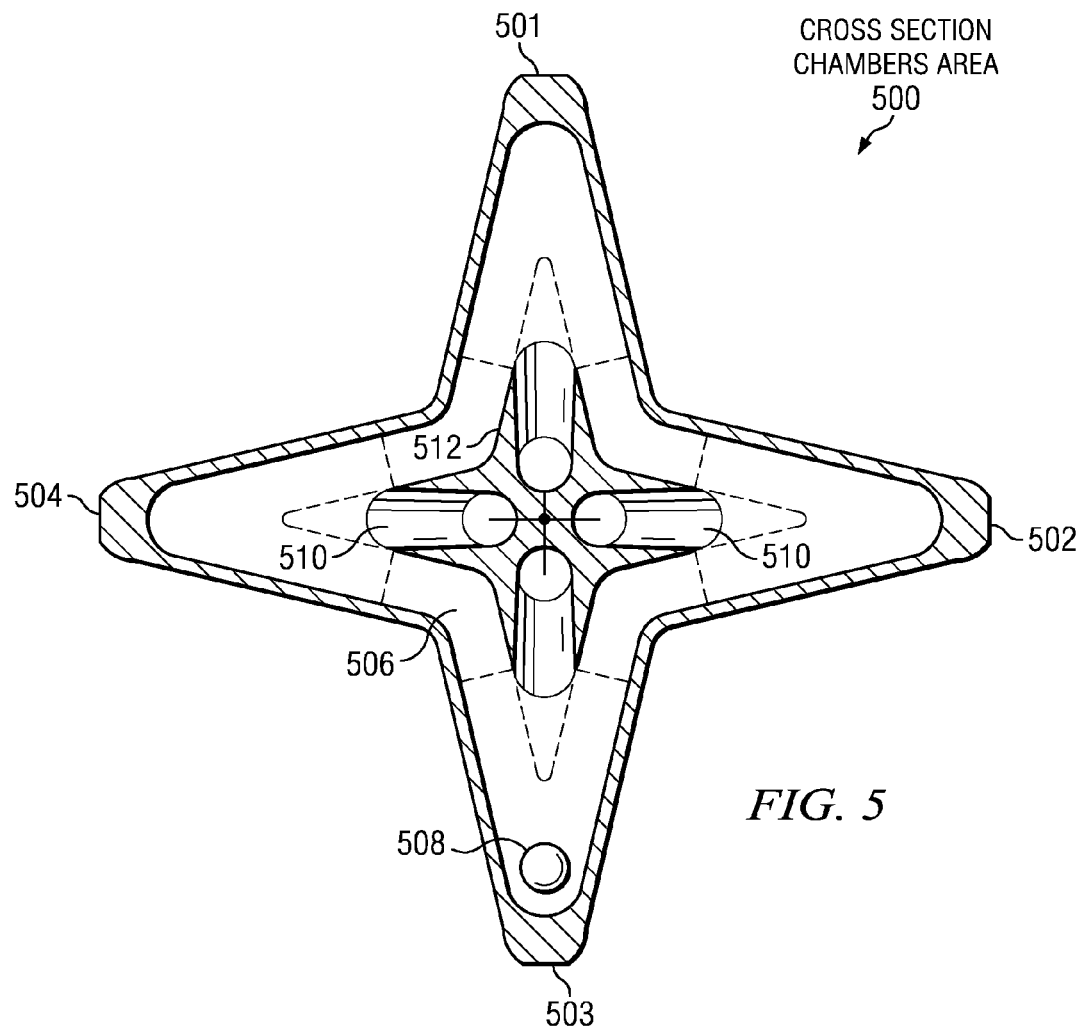
FIG. 5 depicts a cross section of a second embodiment of the orientation apparatus that shows the inner parts of four of the six chambers of the orientation device in accordance with the illustrative embodiments.

FIG. 5 is a depiction of a cross section of a second embodiment of the orientation apparatus that shows the inner parts of four of the six chambers of the orientation device in accordance with the illustrative embodiments. The chambers not depicted in the figure are perpendicular to the depicted chambers. Therefore, there is one chamber not depicted coming out of the page and another chamber not depicted going into the page. Each chamber may be identical. Cross section chambers area 500 shows sensor A 501 in chamber A, sensor B 502 in chamber B, sensor C 503 in chamber C, and sensor D 504 in chamber D. Sensor E in chamber E, going into the page, and sensor F in chamber F, coming out of the page, are not depicted. Ball tunnel 506 is depicted as a tunnel slightly larger than ball 508, which allows ball 508 to move freely through ball tunnel 506 into an adjacent chamber. Holes 510 depict openings for ball tunnels into chamber E. Holes for ball tunnels opening into chamber F are not depicted. Material 512 may be the same solid material of which the chambers are comprised, or may be another material.

Figure 6:
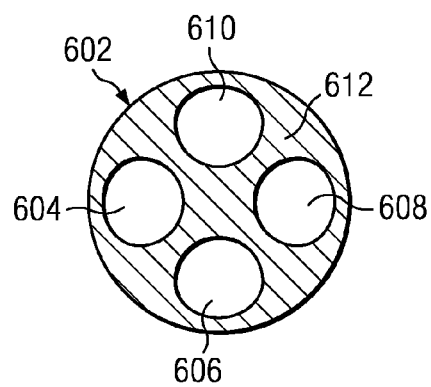
FIG. 6 depicts a cross sectional view of a chamber in a second embodiment of the orientation apparatus illustrating the ball tunnel openings in the wide end of a chamber in accordance with the illustrative embodiments.

FIG. 6 depicts a cross sectional view of a chamber in a second embodiment of the orientation apparatus illustrating the ball tunnel openings in the wide end of a chamber in accordance with the illustrative embodiments. FIG. 6 shows outer chamber wall 602 in a circular configuration, and four openings 604, 606, 608, and 610 in solid material 612. Each opening indicates a ball tunnel, such as ball tunnel 506 of FIG. 5, into an adjacent channel. The tunnel is wide enough for the ball to move freely through the tunnel to an adjacent chamber. The tunnel configuration aids in reducing sensor readings that may indicate a change in orientation when the orientation device has experienced a vibration or bounce. The walls of each tunnel may be constructed to ensure that the ball will not rest in any portion of the tunnel. Further inside the chamber (not depicted), the tunnels open into the single chamber with a ball sensor, such as ball sensor B 502 in FIG. 5, at the tip of the chamber.

FIG. 7 shows an example orientation output formed by the apparatus in accordance with the illustrative embodiments. The example output may be displayed on a small graphic display screen, such as display screen 112 in FIG. 1. Event history 700 displays three events, and indicates the current orientation of the object. The events may be displayed one at a time on the graphics screen, or the user may scroll through the data on the display screen. According to event history 700, record 702 shows the current position of the object is chamber E downward. The packaging may be lettered to indicate the face of the object, or the nomenclature of the event history may be more user readable. For example, the display may indicate the object is upside down rather than chamber E downward. The current event shows an alarm is indicated. In the event of an alarm, different embodiments of the orientation apparatus may respond differently. Some examples of an alarm may be an audible bell, a color change in an indicator light, a communication to a specific user, and/or a broadcast communication to a group of users.

Scrolling event history 700 back through time, event 3 704 took place on Apr. 18, 2006 at 17:43 pm. The object was oriented with chamber A down for 25 hours and 0 minutes. In this example, chamber A down is the correct orientation for the object, therefore no alarm is indicated for event 3 704. Event 2 706 took place on Apr. 18, 2006 at 17:20 pm. The object was oriented with chamber B down for 23 minutes. This was the first event in which an alarm was indicated. Event 1 708 took place on Apr. 18, 2006 at 7:50 am. The object was oriented with chamber A down for 9 hours and 30 minutes. No alarm was indicated, again because chamber A down is the correct orientation for the object.

This example shows a simple output as may be shown on a small display screen. However, in other embodiments the orientation data history may be displayed with more or less detail. The processing of the data may also be more complex. Bounces and jolts that the object experiences may be recorded and interpreted by user configurable software. An example of the software logic may be that, if a sensor senses the ball, then does not sense the ball for less than three seconds, then senses the ball again, the event may be considered a bounce. Those of ordinary skill in the art will appreciate that there are many such computer implemented algorithms that may be applicable.

Figure 8:
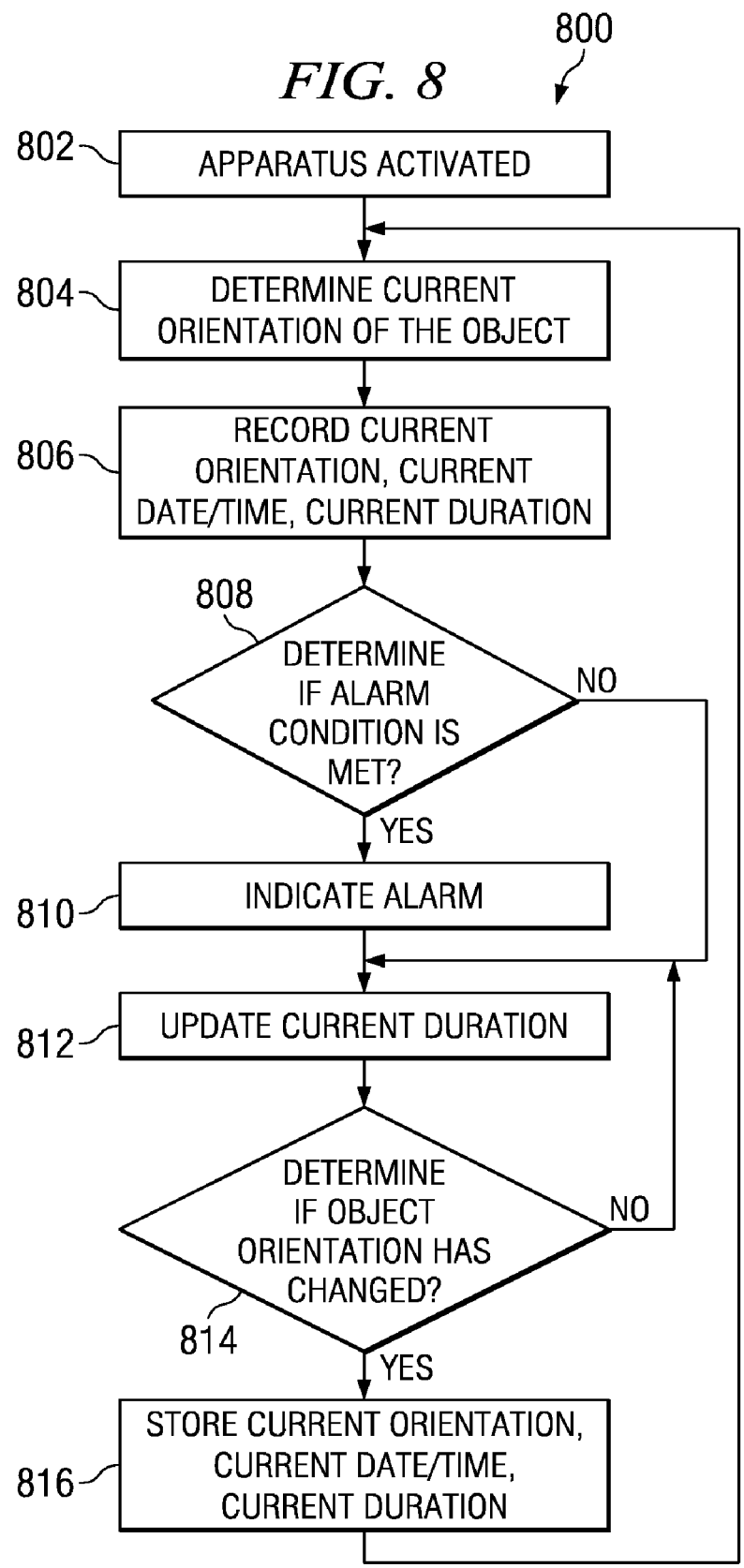
FIG. 8 shows a flowchart that illustrates a method of a top-level process flow for detecting, recording, and communicating orientation data according to the illustrative embodiments.

FIG. 8 is a flowchart that illustrates a method of a top-level process flow for detecting, recording, and communicating orientation data according to the illustrative embodiments. The apparatus in the example may be an illustrative embodiment that includes an immediate alarm mechanism. The apparatus is activated (step 802). The user may flip a switch that activates the apparatus, or in another embodiment, the apparatus may receive a signal that causes activation. The apparatus determines the current orientation of the object (step 804). The determination is made based on input from the sensors located in the tip of each chamber.

The apparatus records the current orientation, date, time, and duration of the current event (step 806). Next, the apparatus determines whether an alarm condition is met (step 808). If yes, an alarm condition is met (yes output to step 808), the alarm is indicated (step 810), and the apparatus updates the current duration (step 812). Returning to step 808, if an alarm condition is not met (no output to step 808), the current duration is updated (step 812). Next, the apparatus determines whether the orientation of the object has changed (step 814). If no, the orientation of the object has not changed, then the current duration is updated (step 812). If yes, the orientation of the object has changed, then the apparatus stores the current event record as the next event record in the sequence (step 816), and returns to determining the current orientation of the object (step 804).

Figure 9:
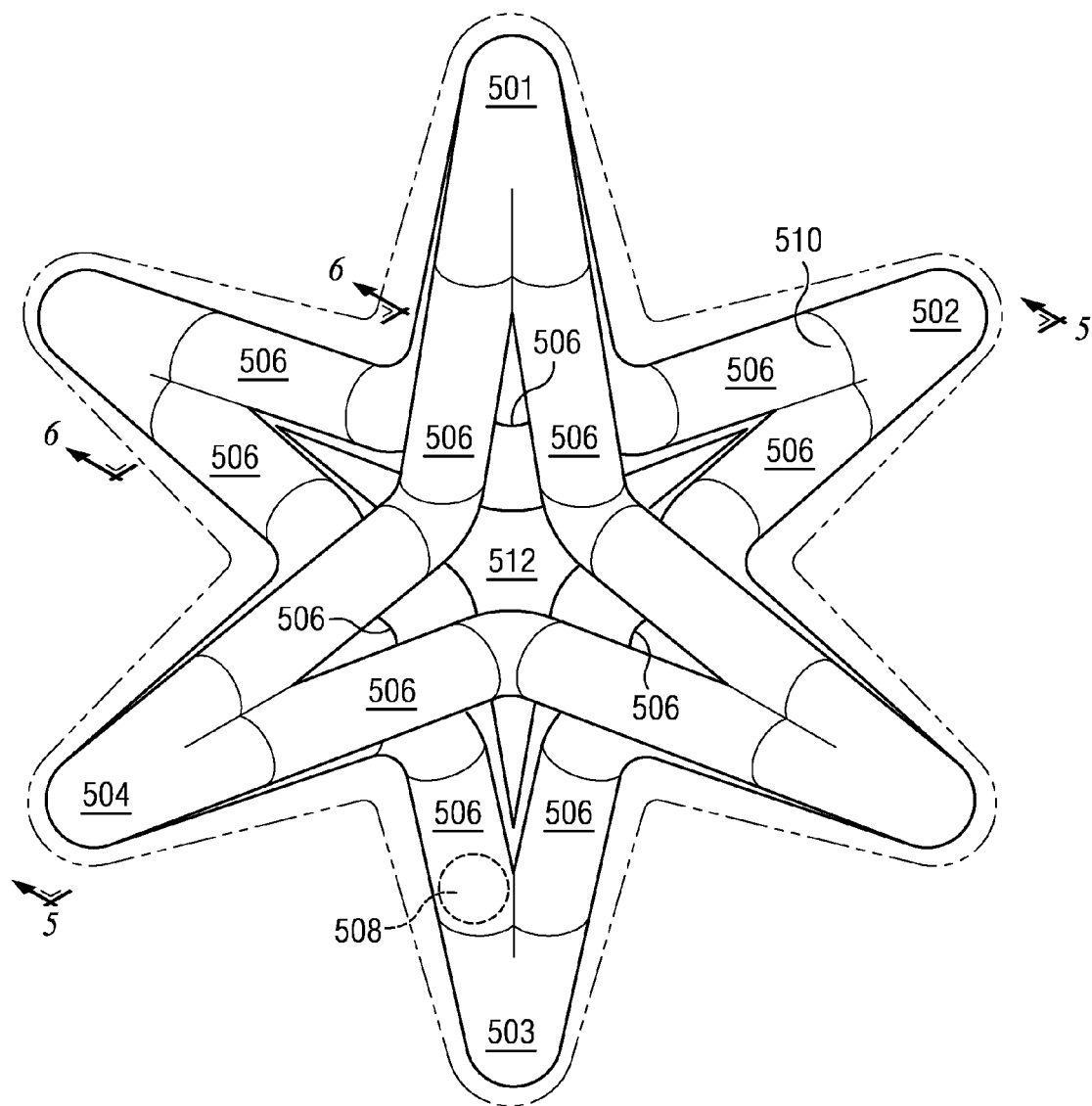
FIG. 9 is a see through view of the second embodiment of the orientation apparatus.

FIG. 9 depicts a see through view of the second embodiment of the orientation apparatus that shows the inner parts of the chambers of the orientation device in accordance with the illustrative embodiments. FIG. 9 also shows the location of the cross section depicted by FIG. 5 and the location of the cross section depicted by FIG. 6.

In another embodiment, the apparatus may determine whether a triggering condition is met. A triggering event occurs whenever the ball activates a different tip sensor; however, the apparatus may merely store the information in the event history and not excite an immediate alarm.

The invention can take the form of an entirely hardware embodiment, an entirely software embodiment or an embodiment containing both hardware and software elements. Comment: Please explain the previous sentence. We're not sure how a completely software embodiment applies. Furthermore, the invention can take the form of an apparatus in conjunction with a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An orientation apparatus comprising:
   an outer casing;
   an orientation device within the outer casing, wherein the orientation device comprises a set of chambers, each chamber having a wide end and a chamber tip, a set of two or more chamber connecting tunnels, each chamber connecting tunnel making a connection between two adjacent chambers, a ball sensor in each chamber tip, and a ball; and
   wherein the wide end of each chamber contains openings in a solid material to one or more of the set of two or more chamber connecting tunnels for connecting the wide end of each chamber to adjacent chambers; and
   wherein the ball moves freely through each of the chamber connecting tunnels to the openings of adjacent chambers;
   a data recorder for recording an event history; and
   a communicator for conveying the event history.

2. The orientation apparatus of claim 1, wherein each chamber tip terminates in a different face of a cubically shaped outer casing; and wherein the ball must first move through at least one of the adjacent chambers before the ball can move to the chamber on the opposite side of the cube.

3. The orientation apparatus of claim 1, wherein the data recorder is one of a solid state memory, an optical disk, or a magnetic disk.

4. The orientation apparatus of claim 1, wherein the data recorder is physically located outside the outer casing.

5. The orientation apparatus of claim 1, wherein the data recorder is physically located inside the outer casing.

6. The orientation apparatus of claim 1, wherein the communicator is physically attached to the outer casing.

7. The orientation apparatus of claim 1, wherein the ball sensor is at least one of a pressure switch, an electrical contact switch, or an optical switch.

8. The orientation apparatus of claim 1, wherein the communicator is at least one of a text screen, an audio signal, an indicator light, or any combination of text screen, audio signal, and indicator light.

9. The orientation apparatus of claim 1, wherein the data recorder comprises a processor with instructions to convert raw sensor data into processed sensor data, wherein the processed sensor data does not include bounce or vibration sensor data based on the configuration of the chamber connecting tunnels.

10. An orientation monitoring system comprising:
    an object of interest;
    an apparatus for monitoring each orientation of the object, wherein the apparatus comprises:
    an outer casing;
    an orientation device within the outer casing, wherein the orientation device comprises a set of chambers, each chamber having a wide end and a chamber tip, a set of two or more chamber connecting tunnels, each chamber connecting tunnel making a connection between two adjacent chambers, a ball sensor in each chamber tip, and a ball; and
    wherein the wide end of each chamber contains openings in a solid material to one or more of the set of two or more chamber connecting tunnels for connecting the wide end of each chamber to adjacent chambers; and
    wherein the ball moves freely through each of the chamber connecting tunnels to the openings of adjacent chambers;
    a processor for interpreting each orientation of the object, forming orientation information;
    a storage device for storing orientation information; and
    a user interface for communicating orientation information to a user.

11. The orientation monitoring system of claim 10, wherein the processor, storage device, and user interface are located within the outer casing.

12. The orientation monitoring system of claim 10, wherein the processor, storage device, and user interface are located outside of the outer casing.

13. A computer implemented method for monitoring an orientation of an object, the computer implemented method comprising:
    interpreting orientation sensor data associated with the object, wherein the orientation sensor data is from a device comprising:
    an outer casing;
    an orientation device within the outer casing, wherein the orientation device comprises a set of chambers, each chamber having a wide end and a chamber tip, a set of two or more chamber connecting tunnels, each chamber connecting tunnel making a connection between two adjacent chambers, a ball sensor in each chamber tip, and a ball; and
    wherein the wide end of each chamber contains openings in a solid material to one or more of the set of two or more chamber connecting tunnels for connecting the wide end of each chamber to adjacent chambers; and
    wherein the ball moves freely through each of the chamber connecting tunnels to the openings of adjacent chambers;
    storing a record of each orientation of the object; and
    communicating a history of each orientation of the object to a user.

14. The computer implemented method of claim 13, wherein interpreting orientation sensor data additionally comprises computer readable instructions for eliminating bounce and vibration data based on the configuration of the chamber connecting tunnels.

15. The computer implemented method of claim 13, wherein interpreting orientation sensor data additionally comprises computer readable instructions for creating an event history.

* * * * *